னித

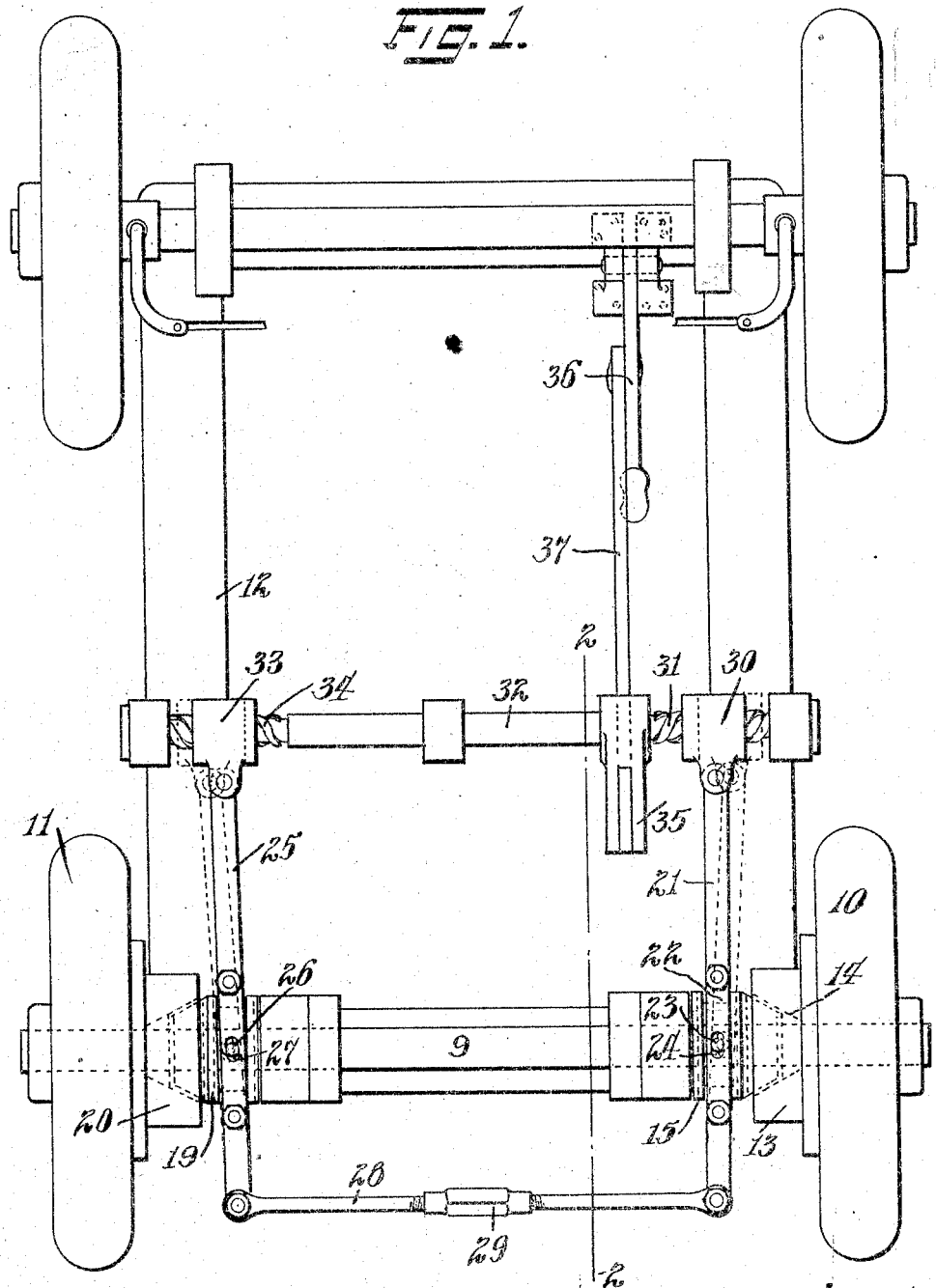

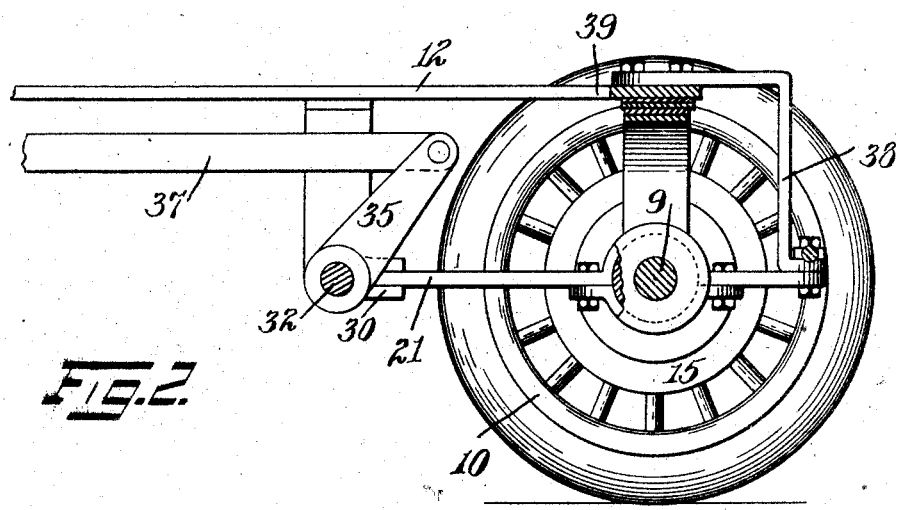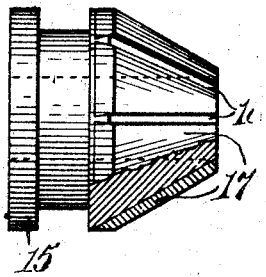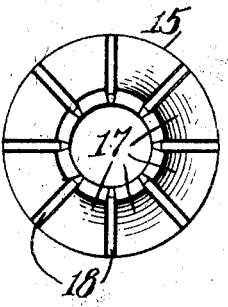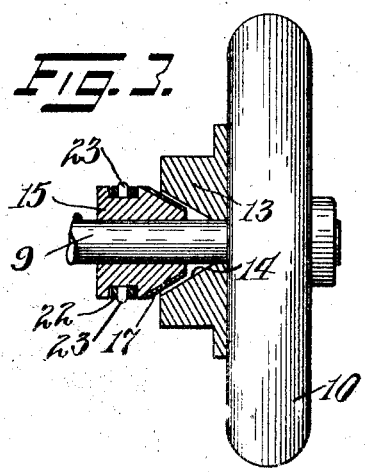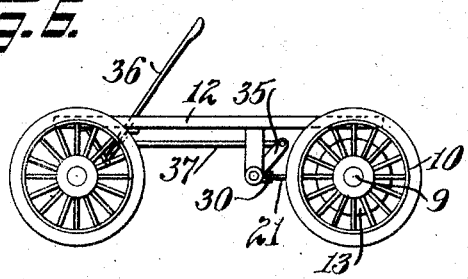

UNITED STATES PATENT OFFICE.

BARTHOLOMEW VIOLA, OF BROOKLYN, NEW YORK.

VEHICLE-BRAKE.

No. 865,002.　　　Specification of Letters Patent.　　　Patented Sept. 3, 1907.

Application filed August 30, 1906. Serial No. 332,563.

*To all whom it may concern:*

Be it known that I, BARTHOLOMEW VIOLA, a citizen of the United States, residing in borough of Brooklyn, in the county of Kings and State of New York, have invented certain new and useful Improvements in Vehicle-Brakes, of which the following is a specification.

This invention has reference to devices for arresting the movement of vehicle wheels, wherein the stopping of the vehicle is caused by a brake arrangement operated by a person carried by the vehicle.

One of the objects of the invention is to provide an improved form of brake device whereby two of the wheels, either front or rear, can have a slight resist applied thereto for the purpose of slightly retarding the vehicle, or can have a very strong pressure applied whereby the rotation of the wheels will be very rapidly and efficiently arrested and held in such position against further movement.

A further object of the invention is to provide a brake device that will be equally operative on both wheels; and which will have a wedge action retaining the brake in locked position.

In the accompanying drawings presenting one embodiment of my invention, Figure 1 is a bottom plan view of the device applied to the running gear of a vehicle, in the nature of a motor vehicle. Fig. 2 is a vertical section on the line 2—2 indicated in Fig. 1. Fig. 3 is a transverse section through the clutch member of one wheel. Fig. 4 is a side elevation, partly in section of one of the clutch members. Fig. 5 is an end elevation of clutch member; and Fig. 6 is a side elevation of the vehicle on a reduced scale.

The brake device is shown applied on the rear axle 9 that carries wheels 10 and 11, the axle supporting a frame work denoted generally by 12. For each of the rear wheels a pair of clutch members is provided, one of which is secured to the wheel, and the other shiftable into and out of engagement, but prevented from rotating. The wheel 10 is provided with a clutch member 13 secured thereto, having a conical opening 14, into which slides a cone clutch member 15 that is rotatably mounted on the axle 9. The cone 15 may be provided with a suitable face member to insure its frictional engagement with the other clutch member. As shown, a number of tapered wooden blocks 17, having inclined or dove-tailed sides, slide into dovetailed grooves in the face of the cone member that are formed by means of ribs 18 on the cone whose opposite sides are undercut or beveled as shown, converging outwardly. Upon these wooden blocks being slipped into position and driven home, they will be very tightly engaged between the ribs and securely locked in position against rotation by their frictional engagement with the wheel cone member. A similar clutch member is provided for the wheel 11 comprising a cone 19 rotatable and slidable on the axle 9 into engagement with a clutch member 20 having a conical bore and secured to the wheel 11.

Suitable means are provided for simultaneously moving the cone clutch members into and out of engagement with their respective clutch members. To do this, the cones are simultaneously shifted on the axle toward and from each other. In the construction illustrated, this is accomplished by a single lever or operating member. Means are also provided whereby the pressure or tension on the cone members is equally effected in opposite directions to apply the brakes. As illustrated, the cone members are each operated by a lever, which levers are connected at one end by a link, while the other ends of the levers are moved toward and from each other. A lever 21 has a ring portion 22 surrounding the cone member 15 and pins 23 in the cone member extend into openings 24 in the ring. A lever 25 is similarly connected with the cone member 19 on the opposite side, by pins 26 engaging openings 27 in the lever. At their rear end, the levers are pivotally connected by a link 28, whose pivotal points can be adjusted by means of a turn-buckle 29 to and from each other. At the front end lever 21 is pivotally connected with a nut member 30 that engages a threaded portion 31 of a shaft 32. At its forward end, lever 25 is pivoted to a nut member 33 engaging the threaded portion 34 of the shaft 32 but the latter nut and thread are oppositely formed, that is, the two threaded portions of the shaft are right and left handed, therefore upon rocking the shaft in one direction, the nuts 30 and 33 will be moved toward each other, and will be caused to recede upon moving the shaft in the opposite direction. Any desired means may be employed to rock the shaft 32. As illustrated, the shaft is shown as provided with a crank 35 that is operated by a lever 36 through a connecting rod 37 pivoted to the crank and lever.

From the described construction, it will be seen that when the lever 36 is moved backward, the rocking of the shaft will cause the two nuts to move outwardly and shift the brake levers in the same direction. But the other ends of the levers being connected by a rigid link, will be prevented from movement, therefore the levers will act as if pivoted at their rear to a stationary fulcrum which will cause the cones to move outwardly towards each of the clutch members on the wheels; thereby causing engagement of the brake members. Obviously the swinging of the lever 36 in the opposite direction will move the nut members inward and shift the cones away from their respective clutch members, releasing the brake. The degree of pressure applied on the clutch members can be easily regulated by the amount of movement given to the operating lever. Furthermore, the equal engagement of the two clutch members will be insured by reason of the link 28, permitting the movement of the fulcrum points of the levers by reaction, so that an equal pressure will be applied on the two clutch members. To compensate for wear on the clutch faces, the turn-buckle 29 can be adjusted. And as the wooden face blocks of the cone members of the clutch become worn away, they can be readily replaced by simply driving them out and inserting new ones.

If desired, the weight of the levers operating the clutch members can be carried from the frame, by means of brackets 38 secured to the frame at 39, and extending down to and connected with the levers 21 and 25 at their rear portions.

Having thus described my invention, I claim:

1. In a vehicle brake, the combination with an axle and a pair of wheels carried thereby, of a clutch member secured to each of the wheels on its inner side, a pair of clutch members slidable on the axle into engagement with the said clutch members respectively, means for simultaneously shifting the latter clutch members in opposite directions to engage and disengage the wheel clutch members and adjustable means for insuring the equal engagement of the two slidable clutch members.

2. In a vehicle brake, the combination with an axle and a pair of wheels carried thereby, of a pair of members carried by the axle and having cone shaped faces, clutch members secured to the wheels and provided with coöperating conical surfaces arranged to engage the said cone members respectively, means for simultaneously shifting the cone members on the axle into and out of engagement with the said clutch members and adjustable means for insuring the equal engagement of the two slidable clutch members.

3. In a vehicle brake, the combination with an axle and wheels carried thereby, of a brake member having a cone shaped surface secured to each wheel, a pair of brake members also having cone-shaped surfaces mounted on the axle and shiftable toward and from said wheel brake members, a pair of levers connected with the shiftable brake members, a rock shaft provided with threaded portions, a pair of nut members on the threaded portions of the rock shaft and connected with said levers, and means for rocking the shaft to shift the nut members and thereby swingingly spread and contract said levers, the spreading of the levers operating to shift the shiftable brake members outwardly into engagement with the wheel brake members thereby to brake the vehicle.

4. In a vehicle brake, the combination with an axle and wheels carried thereby, of a clutch member secured to each wheel, a pair of clutch members on the axle movable to and from said clutch members, a pair of levers connected with the movable clutch members, a rock shaft provided with threaded portions, a pair of nut members on the rock shaft at said portions, said levers being connected with the nut member, means for rocking the shaft to shift the nut members and swing said levers, whereby the clutch members are caused to engage and disengage, a link pivotally connecting said levers whereby the cone members will react to shift the levers and produce an equal pressure in the clutch members, and means for adjusting the length of the link member to vary the engagement of the clutch members by the lever.

5. In a vehicle brake, the combination with an axle and a pair of wheels carried thereby, of a clutch member secured to each wheel, a pair of clutch members shiftable on the axle to engage and disengage said clutch members respectively, a pair of levers connected with the shiftable clutch members, a link member pivotally connecting the levers at one end, a rock shaft adjacent the other end of the levers provided with oppositely threaded portions, nut members engaging said threaded portions and secured to the free ends of the levers, means for rocking the shaft for shifting the nuts and levers, whereby the clutch members are caused to engage and disengage, and means for varying the length of said link to cause the pivotal points of the levers to approach or recede.

6. In a vehicle brake, the combination with an axle and a pair of wheels carried thereby, of a brake member secured to each of the wheels on its inner side, a pair of brake members slidable on the axle into engagement with the said brake members respectively, means for simultaneously shifting the latter brake members in opposite directions to engage and disengage the wheel brake members and means connected to the slidable brake member and including an adjustable connecting link for insuring the equal engagement of said slidable brake members.

7. In a vehicle brake, the combination with an axle and a pair of wheels carried thereby, one having a cone-shaped surface, of a member carried by and movable on the axle toward and from said wheel brake member and also having a cone-shaped surface, one of said surfaces having a removable face comprising a series of tapered members carried by dovetailed ribs, and means for shifting the axle member into and out of engagement with the cone-shaped surface of the wheel member.

8. In a vehicle brake, the combination with an axle and a pair of wheels carried thereby, each having cone-shaped bores, of a pair of cone-shaped members carried by the axle, each having a removable face comprising a series of tapered members carried by dovetailed ribs, and means for shifting the cone-shaped members on the axle into and out of engagement with the cone-shaped bores of the wheels.

Signed at Nos. 9–15 Murray st., New York, N. Y., on this 29th day of August, 1906.

BARTHOLOMEW VIOLA.

Witnesses:
WILLIAM H. REID,
F. E. BOYCE.